343-756

SEARCH ROOM

April 24, 1962 M. WIELOBOB 3,031,664

POLARISATION SCREEN AND FILTER FOR RADIO WAVES

Filed Nov. 12, 1959

INVENTOR
Mieczyslaw Wielobob
BY Baldwin & Wight
ATTORNEYS 3,031,664

POLARISATION SCREEN AND FILTER FOR RADIO WAVES

Mieczyslaw Wielobob, Danbury, England, assignor to Marconi's Wireless Telegraph Company Limited, London, England, a company of Great Britain Filed Nov. 12, 1959, Ser. No. 852,340
Claims priority, application Great Britain Oct. 1, 1959
5 Claims. (Cl. 343—756)

Figure 1:
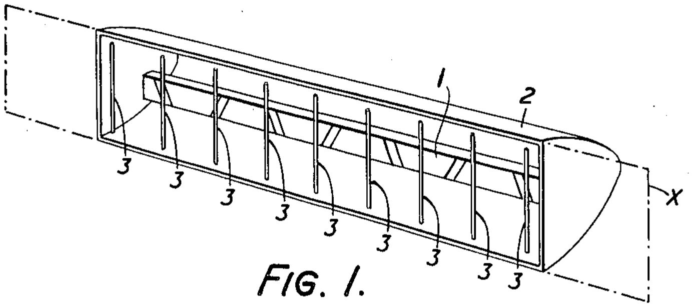

This invention relates to polarisation screens and filters for radio waves and has for its object to provide improved, efficient and simple polarisation screens or filters (hereinafter termed simply "polarisation screens") which will pass radio waves which are polarised in one predetermined direction and stop, or at any rate powerfully obstruct, waves which are polarised in the perpendicular direction.

The need for a polarisation screen which will pass practically without obstruction, waves of one predetermined direction of polarisation, and stop or obstruct waves polarised at right angles thereto, is one which often arises. Transmitting aerial systems intended and designed to radiate with one particular polarisation, e.g. vertically polarised waves, will in fact almost inevitably radiate a certain amount of horizontally polarised wave energy. Again receiving aerials required to respond to waves of one predetermined polarisation may, in fact, commonly be exposed to and will respond to some extent to, waves of the perpendicular polarisation. In many cases, notably in radio direction finding installations and certain other radio navigation aids, the presence of waves of undesired polarisation is highly objectionable and may result in serious errors. It is common, therefore, to "protect" aerial systems, whether for transmission or reception, or both, by means of polarisation screens whose purpose is to pass only waves of the desired polarisation. The present invention relates to such polarisation screens.

Known polarisation screens are essentially attenuation devices for waves of other than the desired polarisation, and operate by damping out such undesired waves. They consist of screens of conductive parallel rods, or more usually plates, interposed in the path of the radiation, and closely spaced in terms of wavelength. This close spacing of the rods or plates is, indeed, characteristic of known polarisation screens and, in present day practice, it is well recognised that the closer the spacing, up to a limit set by other considerations the better. The spacing of adjacent rods or plates in a known polarisation screen seldom if ever exceeds about $\lambda/10$ (where $\lambda$ is the working wavelength) and is commonly a good deal less than this. Commonly the rods or plates of a known polarisation screen are connected together at one or at both ends.

The present invention provides improved polarisation screens which operate on a principle quite different from the damping or attenuation principle of the known screens and according to the said present invention in its broadest aspect a polarisation screen consists of a plurality of parallel disposed, individually unconnected (i.e. unconnected electrically) resonant conductors so spaced and positioned as to re-radiate a field substantially equal to and 180° out of phase with the unwanted polarisation field running in the direction of length of the conductors. A polarisation screen in accordance with this invention thus substantially prevents the passage of waves polarised in a direction perpendicular to a desired direction not by damping out the undesired waves, but by substantially cancelling them by re-radiation. The resonance of the conductors is obtained in the ordinary well known way by properly choosing their electrical length i.e. either by choosing the physical length at resonance or by making them of some other length and loading them electrically.

In its simplest form a polarisation screen according to this invention consists of a plurality of parallel disposed, individually unconnected (i.e. unconnected electrically) conductive rods each substantially one half wave length long electrically spaced apart from one another by approximately one half wave length or a multiple thereof. The rods are made electrically, $\lambda/2$ long so as to be resonant, this electrical length being obtained either by using conductors of this length physically or by using conductors of shorter wavelength physically, but electrically loaded in accordance with well known principles.

The normal use of a screen in accordance with this invention will be in conjunction with an antenna. Thus, for example, in the case of a transmitting aerial system intended to transmit horizontally polarised waves, a polarisation screen in accordance with this invention would be provided to eliminate vertically polarised waves or, in the case of a receiving aerial system intended to respond to horizontally polarised waves, a polarisation screen in accordance with this invention would be provided in order to prevent vertically polarised waves reaching the aerial system. In either event the spacing between the polarisation screen and the effective aperture of the aerial system to be protected is so chosen with relation to the working wavelength that the required cancellation of radiation of undesired polarisation is obtained. In general, this spacing will be approximately $\lambda/4$ or an odd multiple thereof.

Although the spacing of the conductors of a polarisation screen in accordance with this invention will, in general, be approximately $n\lambda/2$ (where $n$ is any whole number including unity) and the spacing of the screen from an associated aerial system will, in general, be approximately $m\lambda/4$ (where $m$ is any whole odd number including unity), it is extremely difficult to determine the optimum spacings theoretically in any particular case and it is much better and easier to do so by trial and error. The difficulty about theoretical treatment is that, although each of two half-wave rods, spaced by $\lambda/2$ in a screen which is $\lambda/4$ from the aperture of an associated aerial will, if considered alone, theoretically re-radiate at 180° to the unwanted polarisation field, each is not in fact alone but is affected by re-radiation from the other and in a screen consisting of any considerable number of re-radiators, this mutual effect is extremely difficult to calculate with acceptable accuracy. It is, however, comparatively easy to determine the optimum spacings by trial and error. For example, consider the case in which a radio transmitting beacon, transmitting horizontally polarised waves and having a rotating figure-of-eight polar radiation diagram, is required to be surrounded by a polarisation screen in accordance with this invention for eliminating vertically polarised waves or reducing them as far as possible. To calculate the optimum positioning of the rods would be difficult, but it is comparatively easy to achieve a close approximation to such positioning by the following procedure: use is made of a receiving equipment having two dipoles—one horizontal and one vertical connected by leads of equal electrical length to a receiver proper. The leads are flexible to allow the distance between the two dipoles to be varied without varying the electrical lengths to the receiver proper and switch means are provided to enable either the horizontal dipole alone or both dipoles together to feed into the receiver. The equipment is taken to a point say ¼ or ½ a mile from the beacon and the dipoles are set up with the line between their centres pointing towards the beacon. Reception is effected first with the horizontal dipole alone and the equipment used in the normal way to give a "first" bearing of the beacon. Reception is then effected with both dipoles and a "second" bearing reading taken. If vertically polarised waves as well as horizontally polarised waves are being received this "second" bearing will differ from the "first" by a certain amount. The horizontal dipole is then moved towards or away from the vertical dipole (which is kept fixed) until the amount of difference is at a maximum. The vertical dipole is then rotated through 180° and a "third" bearing taken, again using both dipoles. The angle between the "second" and "third" bearings is herein termed the "error" and is an indication of the presence (and amount) of incoming vertically polarised radiation. A few rods of the polarisation screen are then set up across the path from the beacon to the receiving equipment with an initial spacing from one another of approximately $n\lambda/2$ and an initial spacing from the beacon of approximately $m\lambda/4$ and the "error" measured again. The "error" will be found to be reduced. The rods are then adjusted in spacing, at first from one another and then from the beacon, and an "error" measurement taken after each adjustment until the error is reduced to approximately zero or to an acceptable amount. The screen is then completed on the information as to optimum spacings given by this series of experiments and a few more tests taken with the receiving equipment in different directions from the beacon will suffice to ensure that the whole screen is satisfactory. In general it will be found that the optimum spacings will be a little less than the values of $n\lambda/2$ and $m\lambda/4$ indicated by simplified theory. However, in all cases, the spacings of the conductors of the screens from one another will be a great deal more—several times more—than the characteristically small separations ($\lambda/10$ or less) of the conductors of an ordinary known "attenuating" polarisation screen.

Figure 2:
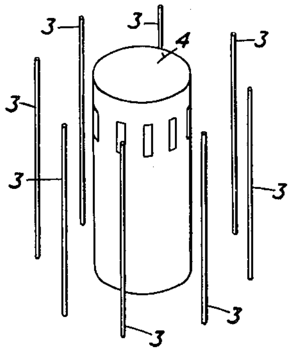

The invention is illustrated in the accompanying drawings in which FIG. 1 is a simplified perspective view showing the invention applied to a polarisation screen for an aerial system of the slotted waveguide and reflector type; and FIG. 2 is a simplified perspective view showing the invention applied to a polarisation screen for a radio beacon of the rotating figure-of-eight polar diagram type. In both cases the aerial system is intended to radiate horizontally polarised waves. Both figures are schematic and not to scale.

In FIG. 1 the aerial system is a horizontally polarised system of the slotted waveguide and reflector type comprising a slotted waveguide aerial 1 at the focus of a parabolic reflector 2. The effective aperture of the system constituted by the aerial and the reflector is in the plane indicated by the chain lines X. This aerial system, though intended to produce horizontally polarised waves will also in fact produce a certain proportion of vertical polarised waves. To eliminate such vertical polarised waves or to reduce them to acceptable proportions, there is provided a polarisation screen so designed and arranged as substantially to cancel out the field of the vertical polarised waves. This screen consists of a series of parallel conductive rods 3 each electrically unconnected to anything else. These rods may be supported by insulators or in any other convenient way (not shown) and are spaced from one another and forward of the plane of the aperture of the aerial system with spacings selected by trial and error in some such manner as that already described. The rods, which are resonant at the operating wavelength—each is electrically a half wavelength long—will in general be spaced a little less than half a wavelength from one another and lie in a plane which is approximately a quarter of a wavelength in front of the aperture plane.

In the modification shown in FIGURE 2 the aerial system is of any type well known per se in radio beacons and is adapted to radiate a rotating figure-of-eight polar radiation diagram of horizontally polarised waves. This aerial system is schematically represented by the slotted tower 4. Arranged around the tower and concentric therewith is a polarisation screen in accordance with this invention and consisting of the electrically unconnected resonant vertical rods 3 which are spaced from one another and from the tower 4 with spacings determined by trial and error in some such manner as that hereinbefore set forth.

Although in FIGURES 1 and 2 only one polarisation screen is shown in each case, it is possible, if desired, to provide more than one screen one behind the other. Where two or more polarisation screens are provided, there will be almost inevitably some interaction between them and in choosing the spacings of the screens and of the conductors composing them, it is best to proceed as hereinbefore described by trial and error since theoretical calculation is a matter of very great difficulty.

In the specification accompanying our co-pending application No. 695,455, filed Nov. 8, 1957, now abandoned, is described an invention according to which an aerial system of rotatable directivity comprises a slotted circularly sectioned waveguide or tower having a ring of longitudinal slots formed therein, and at least one set of resonant conductors extending parallel to the axis of said guide or tower and lying on an imaginary cylindrical surface concentrically surrounding the same. The said co-pending specification describes and illustrates two embodiments of the invention therein. No claim is made in the present specification to anything already claimed in the said specification No. 695,455 and subject to this disclaimer.

I claim:

1. A polarization screen for an aerial comprising a plurality of conductors, said conductors being parallel positioned, electrically isolated and resonant at the operating frequency of the aerial, means spacing said conductors at least approximately $N\lambda/2$ apart where N is an integer and spaced relative to said aerial for radiating a field substantially equal to and 180° out of phase with the unwanted polarization from said aerial radiating in the direction of the length of the conductors.

2. A polarization screen according to claim 1 wherein said conductors are each substantially one half wave length long.

3. A polarization screen according to claim 1 wherein said means includes means for spacing said screen approximately $M\lambda/4$ from said aerial wherein M is an odd integer.

4. The combination as claimed in claim 1 wherein said aerial comprises a slotted wave guide and an associated reflector and wherein the polarization screen is spaced by said means from said slotted waveguide a distance of approximately $M\lambda/4$ wherein M is an odd integer.

5. The combination according to claim 1 wherein said aerial is of the slotted tower type adapted to radiate a rotating figure-of-eight polar radiation diagram of horizontally polarized waves and wherein said means spacing said conductors supports said conductors parallel to the axis of the tower on an imaginary cylinder concentric with the axis of and surrounding said tower.

References Cited in the file of this patent

UNITED STATES PATENTS

| | | |
|---|---|---|
| 2,054,896 | Dallenback | Sept. 22, 1936 |
| 2,298,272 | Barrow | Oct. 13, 1942 |
| 2,402,622 | Hansen | June 25, 1946 |
| 2,726,389 | Taylor | Dec. 6, 1955 |
| 2,760,192 | Shanklin | Aug. 21, 1956 |
| 2,820,965 | Sichak | Jan. 21, 1958 |
| 2,835,890 | Bittner | May 20, 1958 |

FOREIGN PATENTS

| | | |
|---|---|---|
| 1,120,672 | France | Apr. 23, 1956 |

OTHER REFERENCES

Aviation Week, vol. 70, No. 1, Jan. 5, 1959, pages 66, 67 and 69.